July 8, 1924.

G. R. KUNKLE

ELECTRIC MOTOR MECHANISM

Filed Dec. 16, 1921      2 Sheets-Sheet 1

1,500,825

George R. Kunkle,
INVENTOR.

BY Richey Slough & Vales

HIS ATTORNEYS

July 8, 1924.

G. R. KUNKLE 1,500,825

ELECTRIC MOTOR MECHANISM

Filed Dec. 16, 1921  2 Sheets-Sheet 2

George R. Kunkle
INVENTOR.

BY Richey Slough & Fales

HIS ATTORNEYS

Patented July 8, 1924.

1,500,825

UNITED STATES PATENT OFFICE.

GEORGE R. KUNKLE, OF ELYRIA, OHIO.

ELECTRIC-MOTOR MECHANISM.

Application filed December 16, 1921. Serial No. 522,755.

*To all whom it may concern:*

Be it known that I, GEORGE R. KUNKLE, a citizen of the United States, residing in Elyria, in the county of Lorain and State of Ohio, have invented certain new and useful Improvements in Electric-Motor Mechanisms; and I do hereby declare the following to be a full, clear, concise, and exact description of the invention, such as will enable others skilled in the art to which my invention appertains to make and use the same.

My invention relates to electric motor mechanisms, and particularly to motor mechanisms of such size and kind as are adapted for such a purpose as driving the turn-table of a phonograph at a pre-determined and uniform rate of speed.

It is an object of my invention to provide a motor of the type above referred to which will be capable of causing the driving mechanism such as a phonograph turn-table to be rotated at a pre-determined speed as quickly as possible after the motor is connected to the electric circuit to energize it.

Another object of my invention is to provide a mechanism of the above type which will be simple in construction and relatively inexpensive to manufacture, and which will remain in proper operating adjustment for considerable periods of time, and which will require little or no attention to maintain it in proper operative adjustment.

Another object of my invention is to provide such a mechanism comprising such parts which may be easy to assemble into the complete mechanism.

A further object of my invention is to provide a motor mechanism wherein there is embodied a pair of differentially rotatable parts and in which one of the parts is connected to the load, the other part rotating at speeds determined by a governor driven by the first part whereby the load will be driven at a substantially uniform speed.

Other objects of my invention and the invention itself will be better understood from a description of a specific embodiment of my invention, and in which description reference will be had to the drawings accompanying this specification and forming a part thereof. Referring to the drawings.

Figures 1, 2, 3:
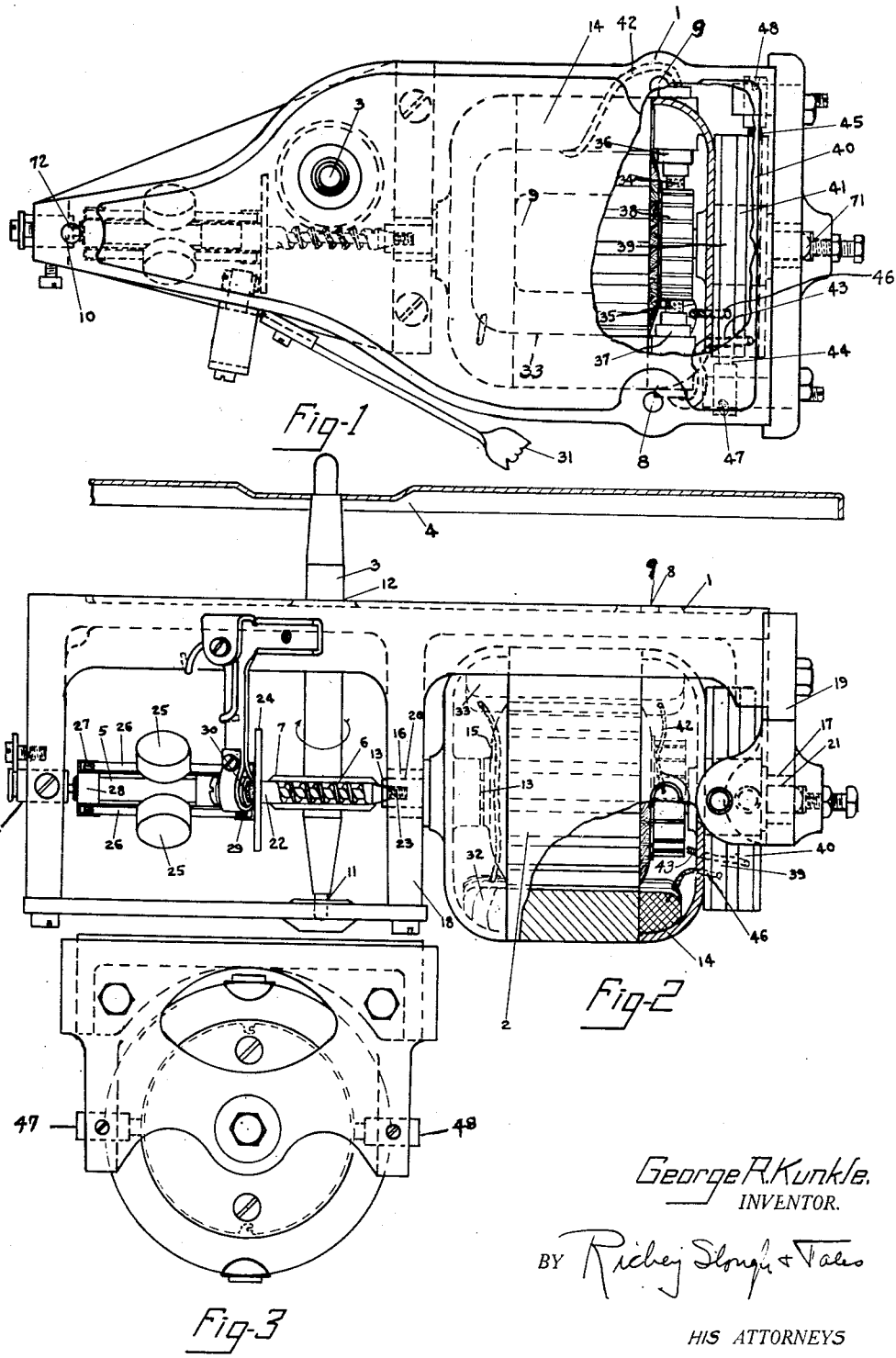
Fig. 1 is a plan view of an embodiment of my invention.
Fig. 2 is a side elevation thereof.
Fig. 3 is an end elevation.

Referring now to the above figures in all of which like parts are designated by like reference characters, at 1 I show a cast iron frame member within which is mounted the electric motor, 2, the turn-table supporting shaft, 3, which carries a turn-table, 4, on its upper end, a friction governor, 5, and a worm shaft, 6, adapted to drive the shaft, 3, through a gear, 7.

All of the above parts are mounted in the frame, 1, and the shaft, 3, projects upwardly from said frame a sufficient distance so that when the mechanism is to be placed in a phonograph casing, the frame, 1, carrying all of the above parts may be mounted on the underside of a phonograph motor supporting board by means of the screw or bolt openings 8, 9, and 10 in the frame, 1, screws or bolts being adapted to pass through the said openings into the said wood supporting board to secure the frame to the underside of the board, the board being perforated so as to permit the shaft, 3, to pass through it whereby the turn-table, 4, which is carried on the upper end of the shaft, 3, may be rotated by the shaft in a horizontal plane above the supporting board.

The shaft, 3, is journaled in the frame, 1, the lower end resting in a bearing, 11, and an intermediate portion, 12, being journaled in the upper plate of the frame, 1. The shaft, 3, carries between its journals a gear, 7, which is adapted to be rotated by a worm shaft, 6, driven from the electric motor armature shaft, 13.

The electric motor, 2, has a pair of oppositely and differentially rotatable members comprising a field, 14, and an armature, 15, the armature, 15, being journaled at 20 and 21 in depending portions 18 and 19 of the frame, 1. Non-friction bushings 16 and 17 are non-rotatably mounted in the said depending frame portions, the shaft, 13, of the armature passing through the said bushings.

The armature, 15, is capable of rotation in one direction, while the field frame will rotate in the opposite direction on the shaft, 13, of the armature. The worm shaft, 6, is integrally formed on a rod, 22, whose end, 23, is screw threaded in the end of the armature shaft, 13, so as to make a driving connection with the end of the shaft, 13, whereby the said shaft may drive the said worm shaft, 6. The rod, 22, terminates at its other end in a friction governor mechanism, 5, comprising a rotatable disc, 24, and centrifugal weights, 25, are carried on flexible springs, 26, the said springs being rigidly secured at one end by screws, 27, to a flange, 28 on the rod, 22, and being secured at the other end at, 29, to the disc, 24, which is loosely carried on the shaft, 22, and adapted to be longitudinally reciprocated thereon.

This is the usual friction governor construction, and it is well understood in the art how when the rod at 22 is rotated by the rotating armature, 20, the centrifugal weights, 25, being thrown outwardly by centrifugal force, will cause the disc, 24, to be reciprocated toward the weights, 25, along the rod, 22, so that the face of the disc, 24, will make contact with the stationary friction pad, 30, whose speed controlling position is determined by the position of an attached controlling lever, 31, which may be differently adjusted according to the will of the operator, who will thus pre-determine the speed at which the turn-table, 4, is to be rotated.

The motor, 2, has an armature, 15, and field coils, 32, and 33, of the usual type employed for motors of the direct current type, or of the so-called universal type which may be operated from a source of alternating or direct current. Motor brushes, 34, and 35 mounted in brush holders, 36 and 37, are adapted to contact with the commutator, 38, on opposite sides thereof, the brush holders being mounted in the field frame, 14. Slip rings, 39 and 40, are carried on the hub, 41, of the field frame, 14, but insulated therefrom and adapted to rotate with the field frame, 14. One of the brushes such as 34 is connected by a circuit conductor, 42, to the field winding comprising the coils 32, and 33, preferably connected in series, and another circuit conductor, 46, leads from the serially connected field windings to the slip ring, 39, and the brush, 35, is connected by a conductor, 43, to the slip ring, 40. Co-operating brushes, 44 and 45, are provided to lead energizing current from the source of current to the slip rings, 40 and 39 whereby current may be supplied to the brushes, 34 and 35; thus by connecting the source of current to the terminals, 47 and 48, which lead to the brushes, 44 and 45, the electric motor armature and field windings are energized to cause relative rotation of the armature and field.

By virtue of the above construction, when the mechanism is operating, the governor, 5, will prevent the turn-table, 4, from rotating at greater than a given, pre-determined, maximum speed, and the effort of the armature, 15, to drive the turntable at a greater speed will be always in existence, but curbed by the friction pad, 30, contacting with the friction disc, 24, carried on the extension, 22, of the armature shaft, 13, so that the armature, 13, will be held to a rotational speed pre-determined by the adjustment of the pad, 30, to the disc, 24, and the turn-table, 4, will rotate at a speed relative to the armature, 13, according to the ratio of the worm shaft, 6, and gear, 7, speed transformation ratio; by having the field, 14, rotatable as well as the armature, 15, whenever the armature, 15, is restrained from rotating freely, as by the load of the turntable, 4, and the load consisting of the friction contacting surfaces of the pad, 30, and the disc, 24, the field will be caused to rotate faster by virtue of such restraint, the speed of rotation of the field being determined by the strength of the energizing current applied to the motor windings and the amount of restraint placed upon the free rotation of the armature, 15.

Preferably, I constructed the field and associated carried parts so that it will possess the property of inertia to a relatively larger degree than will the armature and armature driven parts consideration being had to the relative rates of rotation of the different parts.

Therefore, when the operator, desiring to operate the phonograph, closes a switch in the electric circuit of the motor, such switch being understood though not shown being a well-known expedient in this art, the most noticeable immediate effect is the armature rotation, the armature and turn-table coming up to pre-determined phonograph operating speed almost immediately, whereas the field starts in motion slowly, its speed being accelerated by the action of the governor when the governor comes into operation, that is, when the turntable is operating at normal speed.

Figure 6:
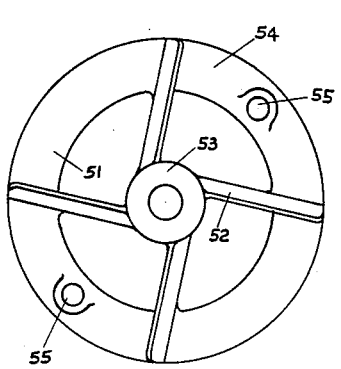
Fig. 6 is an elevational view of a different form of air vane carrying bonnet for the motor.
Figure 7:
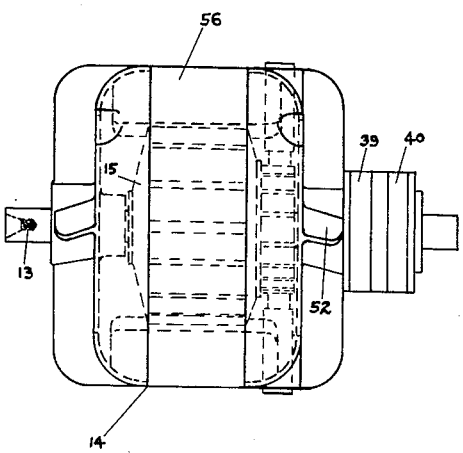
Fig. 7 is a side elevational view of a different embodiment of electric motor from that illustrated in Figs. 1, 2 and 3, in which embodiment the rotating field carries end bonnets at either end with vanes such as is illustrated in Fig. 6.

Whenever desirable I may increase the inertia and the resistance to motion, particularly upon starting, of the rotatable field by the provision of end bonnets for the field illustrated in Figs. 6 and 7, and which end bonnets, 51, carry spokes adapted to act as air vanes, the spokes, 52, being preferably inclined as illustrated, and joining a bonnet hub, 53, to a bonnet rim, 54, there being provided bolt openings, 55, for bolting the bonnets and field iron laminations, 56, together by means of bolts passing through the said openings and corresponding openings in the laminations, the inclination of the vanes, 52, causing a current of air to pass over the field coils particularly at the edges adjacent the vanes. The action of such vanes is to resist rotation of the supporting field by engaging the air in their path.

Figure 4:
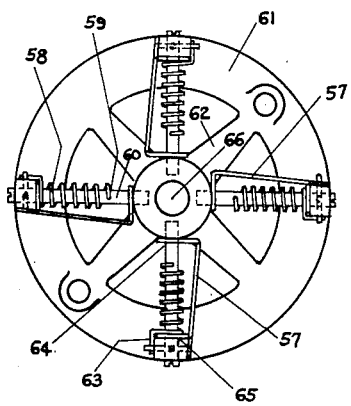
Fig. 4 is a view in elevation of the end bonnet for the electric motor carried on the rotatable field thereof.
Figure 5:
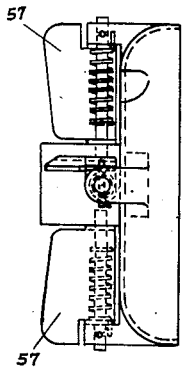
Fig. 5 is a side elevational view of the bonnet and an air vane mounted thereon illustrated in Fig. 4.

In Figs. 4 and 5, I illustrate a modified form of vanes which possess the advantage of being differently effective at different motor speeds, that is, at a low motor speed as when the field is started in rotation, the vanes, 57, of Figs. 4 and 5 take the position as shown wherein they engage maximum amounts of air in their path, the air engaging surfaces being disposed at right angles substantially to the plane of rotation of the field carrying the vanes. These vanes are normally held in such position by the coil springs, 58, secured at one end, 59, to the rods, 60, upon which they are positioned and which rods, 60, are secured in the end bonnet, 61, and which end bonnet has plane spokes such as 62, and the other end of the spring, 63, is secured to the vanes, 57, and the vanes, 57, are rotatably journaled at 64 and 65 on the rods, 64. When the field carrying bonnet, 61, is rotated, thereby rotating the bonnet about its axis, 66, the vanes, 57, engaging the air in their path, will be deflected against the power of the springs, 58, so that they will assume a position wherein their air engaging surfaces come more nearly into the plane of rotation of the bonnets, 61.

I may, and preferably will, employ hubs of the type illustrated in Figs. 4 and 5, or I may employ the hubs of the type illustrated in Figs. 6 and 7, or one of each in connection with my motor, or I may embody in my invention a simple form of motor having no vanes at all, although the use of vanes of this kind is attended by advantages such as quick starting of the turn-table.

It will be noted that I have journaled the shaft, 13, in the frame, 1, and have provided end thrust bearings, 71, and 72, to prevent endwise or axial movement of the shaft.

I elect to claim broadly herein the means whereby a phonograph turntable is driven through the differential action of a pair of differentially rotatable elements, another form of device, employing the broad principles disclosed herein, being shown in my copending application Serial No. 495,756, filed August 26th, 1921, and specifically claimed therein.

Having thus described my invention in a specific embodiment, I am aware that numerous and extensive departures may be made from the embodiment herein illustrated and described, but without departing from the spirit of my invention.

I claim:

1. In a device of the class described in combination with a phonograph turn-table, a drive shaft therefor, an electric motor comprising a pair of differentially rotatable rotor elements, a shaft for one of the said elements, a speed reducing connection between the said rotor shaft and the said turn-table driving shaft, a governor mechanism having a rotatable element driven by the said rotor, means operated thereby adapted to forcibly restrain the said rotor whenever the said rotor reaches a pre-determined high speed.

2. In combination with a phonograph turn-table, an electric motor, a pair of rotors therefor, a magnetic circuit for the said motor comprising both said rotors, a winding on one of the said rotors whereby the said rotor may be energized from a source of electricity, a speed reducing connection between the said turn-table and one of the said rotors and a friction governor adapted to maintain said turn-table at substantially a pre-determined speed by forcibly restraining the movement of the turn-table whenever the turn-table speed tends to increase beyond the said pre-determined speed.

3. In combination with a phonograph turn-table, an electric motor, a pair of rotors therefor, a magnetic circuit for the said motor comprising both said rotors, a winding on one of the said rotors whereby the said rotor may be energized from a source of electricity, a speed reducing connection between the said turn-table and one of the said rotors and a friction governor adapted to maintain said turn-table at substantially a pre-determined speed by forcibly restraining the movement of the turn-table whenever the turn-table speed tends to increase beyond the said pre-determined speed, said other rotor having the greater inertia and exerting the greater resistance with a starting effort when the said winding is energized, whereby the said turn-table will rapidly reach its pre-determined rotational speed.

4. In combination with a phonograph turn-table, an electric motor, a pair of rotors therefor, a magnetic circuit for the said motor comprising both said rotors, a winding on one of the said rotors whereby the said rotor may be energized from a source of electricity, a speed reducing connection between the said turn-table and one of the said rotors and a friction governor adapted to maintain said turn-table at substantially a pre-determined speed by forcibly restraining the movement of the turn-table whenever the turn-table speed is increased beyond the said pre-determined speed, and means to retard the rotational speed of the other rotor.

5. In combination with a phonograph turn-table, an electric motor, a pair of rotors therefor, a magnetic circuit for the said motor comprising both said rotors, a winding on one of the said rotors whereby the said rotor may be energized from a source of electricity, a speed reducing connection between the said turn-table and one of the said rotors and a friction governor adapted to maintain said turn-table at substantially a pre-determined speed by forcibly restraining the movement of the turn-table whenever the turn-table speed is increased beyond the said pre-determined speed, and means to retard the rotational speed of the other rotor, said means being automatically adjustable according to the speed of rotation of the said rotor.

6. In combination with a phonograph turn-table, an electric motor, a pair of rotors therefor, a magnetic circuit for the said motor comprising both said rotors, a winding on one of the said rotors whereby the said rotor may be energized from a source of electricity, a speed reducing connection between the said turn-table and one of the said rotors and a friction governor adapted to maintain said turn-table at substantially a pre-determined speed by forcibly restraining the movement of the turn-table whenever the turn-table speed tends to increase beyond the said pre-determined speed, a means to retard the rotational speed of the other rotor, said means being automatically adjustable according to the speed of rotation of the said motor, said last named retarding means comprises vanes adapted to be rotated by the said last named rotor in a fluid medium.

7. In combination with a phonograph turn-table, an electric motor, a pair of rotors therefor, a magnetic circuit for the said motor comprising both said rotors, a winding on one of the said rotors whereby the said rotor may be energized from a source of electricity, a speed reducing connection between the said turn-table and one of the said rotors and a friction governor adapted to maintain said turn-table at substantially a pre-determined speed by forcibly restraining the movement of the turn-table whenever the turn-table speed tends to increase beyond the said pre-determined speed, a means to retard the rotational speed of the other rotor, said last named retarding means comprising vanes adapted to be rotated by the said last named rotor in a fluid medium.

8. In a phonograph motor mechanism, the combination with a phonograph turn-table, a motor for driving the said turn-table comprising two differentially rotatable elements, speed reducing connections between the said turn-table and one of the said elements, a governor adapted to restrain the said turn-table at a pre-determined speed and to increase the restraint as this speed tends to be exceeded, said other elements rotating at speeds which are increased as the governor restraint on the turn-table increases.

9. In a device of the class described in combination with a phonograph turn-table, a drive shaft therefor, an electric motor comprising a pair of differentially rotatable rotor elements, a shaft for one of the said elements, a speed reducing connection between the said rotor shaft and the said turn-table driving shaft, a governor mechanism having a rotatable element driven by the said rotor, means operated thereby adapted to forcibly restrain the said rotor whenever the said rotor reaches a pre-determined high speed, and speed restraining means for said second element.

10. In a device of the class described in combination with a phonograph turn-table, a drive shaft therefor, an electric motor comprising a pair of differentially rotatable rotor elements, a shaft for one of the said elements, a speed reducing connection between the said rotor shaft and the said turn-table driving shaft, a governor mechanism having a rotatable element driven by the said rotor, means operated thereby adapted to forcibly restrain the said rotor whenever the said rotor reaches a pre-determined high speed, said last named speed restraining means exerting a lesser restraining effect at each rotation of the said second element as the speed of rotation of said second element increases.

11. In a device of the class described in combination with a phonograph turn-table, a drive shaft therefor, an electric motor comprising a pair of differentially rotatable rotor elements, a shaft for one of the said elements, a speed reducing connection between the said rotor shaft and the said turn-table driving shaft, a governor mechanism having a rotatable element driven by the said rotor, means operated thereby adapted to forcibly restrain the said rotor whenever the said rotor reaches a pre-determined high speed, and speed restraining means for said second element, said last named restraining means comprising vanes adapted to be rotated by the said second element against the inertia of a fluid medium.

12. In a device of the class described in combination with a phonograph turn-table, a drive shaft therefor, an electric motor comprising a pair of differentially rotatable rotor elements, a shaft for one of the said elements, a speed reducing connection between the said rotor shaft and the said turn-table driving shaft, a governor mechanism having a rotatable element driven by the said rotor, means operated thereby adapted to forcibly restrain the said rotor whenever the said rotor reaches a pre-determined high speed, said last named speed restraining means exerting a lesser restraining effect at each rotation of the said second element as the speed of rotation of said second element increases, said last named restraining means comprising vanes adapted to be rotated by the said second element against the inertia of a fluid medium.

13. In a device of the class described in combination with a phonograph turn-table, a drive shaft therefor, an electric motor comprising a pair of differentially rotatable rotor elements, a shaft for one of the said elements, a speed reducing connection between the said rotor shaft and the said turn-table driving shaft, a governor mechanism having a rotatable element driven by the said rotor, means operated thereby adapted to forcibly restrain the said rotor whenever the said rotor reaches a pre-determined high speed, said last named speed restraining means exerting a lesser restraining effect at each rotation of the said second element as the speed of rotation of said second element increases, said last named restraining means comprising vanes adapted to be rotated by the said second element against the inertia of a fluid medium, and comprising resilient means adapted to normally hold the vanes in a most effective position, and adapted at higher speeds to be less effective so that the said vanes take a less effective position.

14. In a phonograph motor mechanism, the combination with a phonograph turn-table, a motor for driving the said turn-table comprising two differentially rotatable elements, speed reducing connections between the said turn-table and one of the said elements, a governor adapted to restrain the said turn-table at a pre-determined speed and to increase the restraint as this speed is exceeded, said other elements rotating at speeds which are increased as the governor restraint on the turn-table increases, a means for restraining the rotative motion of the said other element, said means being effective when the said motor is started to cause greater acceleration of the said first element than the said second element.

15. In combination with a phonograph turn-table, an electric motor, a pair of rotors therefor, a magnetic circuit for the said motor comprising both said rotors, a winding on one of the said rotors whereby the said rotor may be energized from a source of electricity, a speed reducing connection between the said turn-table and one of the said rotors and a friction governor adapted to maintain said turn-table at substantially a pre-determined speed by forcibly restraining the movement of the turn-table whenever the turn-table speed tends to increase beyond the said pre-determined speed, a slip ring and brush circuit connecting means for connecting said outside source of current to the said winding.

16. In combination a phonograph turn-table, a turn-table shaft, a motor element, a rotatable element, a governor associated with the said shaft and adapted to restrain the rotational speed thereof to maintain the turn-table at substantially a predetermined speed, said motor element being adapted to rotate the said shaft, said rotatable element being adapted to rotate at a variable speed, the speed of rotation of the said rotatable element being adapted to increase as the restraint by the governor upon the turn-table speed increases, whereby the said turn-table speed is maintained substantially constant independent of variations in power supplied to the said motor.

17. In a phonograph mechanism, the combination with a turn-table and a motor for driving the said turn-table, said motor comprising a motor element and motion transmitting elements together with a rotatable element, means to maintain the turn-table speed substantially constant, said rotatable element being adapted to operate at speeds determined by the resistance of the turn-table to the driving effort of the said motor element.

18. In an electric motor of the class described, the combination with an armature element, a field element, said armature and field elements being each individually and independently rotatable, means to transmit motion from one of said elements, a centrifugally operated governor having rotatable means operable by said element and variably operative according to the speed of said element to retard its speed, and mechanism to retard the speed of rotation of the other element, said means being relatively more effective at lower speeds.

19. In combination, an electric motor, a power shaft therefor, a governor operatively associated with the said shaft, a centrifugal element for the governor adapted to retard the speed of the said shaft as the shaft is rotated beyond a predetermined speed, a pair of independently rotatable magnetic elements in the said motor, one of said elements comprising a magnetic winding, the magnetic circuit for the said winding comprising a portion of the said other element, and retarding means to retard the speed of rotation of the said other element.

20. In combination, an electric motor, a power shaft therefor, a governor operatively associated with the said shaft, a centrifugal element for the governor adapted to retard the speed of the said shaft as the shaft is rotated beyond a predetermined speed, a pair of independently rotatable magnetic elements in the said motor, one of said elements comprising a magnetic winding, the magnetic circuit for the said winding comprising a portion of the said other element, and retarding means to retard the speed of rotation of the said other element, said retarding means being most effective at low speed of the said other element.

21. In combination, an electric motor, a power shaft therefor, a governor operatively associated with the said shaft, a centrifugal element for the governor adapted to retard the speed of the said shaft as the shaft is rotated beyond a predetermined speed, a pair of independently rotatable magnetic elements in the said motor, one of said elements comprising a magnetic winding, the magnetic circuit for the said winding comprising a portion of the said other element, and retarding means to retard the speed of rotation of the said other element, said retarding means comprising a vane, said vane being propelled through a fluid medium by the power of the said other element, said fluid resisting the motion of the vane.

22. In combination, an electric motor, a power shaft therefor, a governor operatively associated with the said shaft, a centrifugal element for the governor adapted to retard the speed of the said shaft as the shaft is rotated beyond a predetermined speed, a pair of independently rotatable magnetic elements in the said motor, one of said elements comprising a magnetic winding, the magnetic circuit for the said winding comprising a portion of the said other element, and retarding means to retard the speed of rotation of the said other element, said retarding means comprising a vane, said vane being propelled through a fluid medium by the power of the said other element, and being adapted to be deflected according to the resistance of the fluid to lessen such resistance.

23. In a mechanism of the class described, a pair of independently rotatable magnetic elements, an energizing winding when energized to cause each element to rotate in opposite directions, a load rotatable by a first said element, and governor means operated by the said first element to cause the other element to vary in rotational speed sufficiently to maintain the first element in rotation at a substantially constant speed.

24. In a device of the class described, a motor, a pair of rotors for the said motor, a phonograph turntable driven by one of the rotors, a governor driven by the said rotor and means for retarding the speed of the other rotor, said governor and said means maintaining the speed of the first rotor at a substantially constant rate.

25. In a device of the class described, a motor, a pair of rotors for the said motor, a phonograph turntable driven by one of the rotors, a governor driven by the said rotor and means for retarding the speed of the other rotor, said governor and said means maintaining the speed of the first rotor at a substantially constant rate, said retarding means being most effective at low speeds.

In witness whereof, I have hereunto signed my name this 5 day of December, 1921.

GEO. R. KUNKLE.